United States Patent [19]

Nemoto

[11] Patent Number: 4,608,744
[45] Date of Patent: Sep. 2, 1986

[54] FRAME MOLDING PROCESS OF A SEAT FOR VEHICLES

[75] Inventor: Akira Nemoto, Akishima, Japan

[73] Assignee: Tachikawa Spring Co., Ltd., Akishimashi, Japan

[21] Appl. No.: 647,029

[22] Filed: Sep. 4, 1984

[51] Int. Cl.[4] .................. B21D 5/00; B29C 49/20
[52] U.S. Cl. ................... 29/527.1; 264/516; 425/DIG. 33
[58] Field of Search .................. 264/515, 516; 425/DIG. 33; 29/421 R, 469.5, 527.1

[56] References Cited

U.S. PATENT DOCUMENTS 2,789,346  4/1957  Algier et al. ............. 425/DIG. 33
3,742,995  7/1973  Confer et al. ............. 264/310 X
4,342,799  8/1982  Schwochert ............... 264/515 X

FOREIGN PATENT DOCUMENTS 38-1224  2/1963  Japan ............. 425/DIG. 33

Primary Examiner—Jan Silbaugh
Attorney, Agent, or Firm—Hoffmann, Dilworth, Barrese & Baron

[57] ABSTRACT

At the time of blow molding of a frame made of synthetic resin in the shape of a hollow plate, a molding process of the frame of a seat for vehicles which comprises a reinforcement plate in the shape of ⊓ with leg portions substantially equal to the thickness of the frame plate is mounted within a molding die, thereby forming said reinforcement plate so as to be embedded within said frame. Furthermore, the upper and lower plates of the frame may be connected to each other by means of the leg portions of said reinforcement plate in the shape of ⊓ so that a frame with a closed construction may be formed.

1 Claim, 5 Drawing Figures

FRAME MOLDING PROCESS OF A SEAT FOR VEHICLES

FIELD OF THE INVENTION

The present invention relates to a frame molding process of a seat for vehicles; and more particularly to a molding process of a panel (in the shape of a plate) made of synthetic resion mounted at the back of a seat such as a back seat etc.

BACKGROUND OF THE INVENTION

Hitherto, as shown in FIG. 1, the kind of a frame (A) has been molded in the shape of a plate by blow molding and thereafter a reinforcement (a') is fixed thereto by means of thermal calking etc. Accordingly, additional man hours are inevitably necessary in order to fix the reinforcement (a') to the frame (A) after the frame (A) has been molded; and moreover said frame (A) is liable to be damaged due to insufficiency of its strength while it is used for a long period of time because the frame to which the reinforcement is fixed is in the shape of a single plate.

SUMMARY OF THE INVENTION

An object of the present invention is to provide a single frame molding process of a seat for vehicles.

Another object of the present invention is to provide a molding process of a seat frame having strengthened rigidity.

The above-mentioned objects can be achieved by a frame molding process of a seat for vehicles which comprises, at the time of the blow molding of a frame in the shape of a hollow plate made of synthetic resin, mounting a reinforcement with leg portions in the shape of ⊓ in its section having a length substantially equal to the thickness of the frame within the molding die thereof so as to embed said reinforcement plate within said frame.

BRIEF DESCRIPTION OF THE DRAWINGS

In the Figures.

In the Figures, (A) is a frame and (b) is a reinforcement plate.

DESCRIPTION OF THE PREFERRED EMBODIMENTS

Hereinafter, the embodiment according to the present invention will be described with reference to FIG. 2 to FIG. 5.

Figure 1:
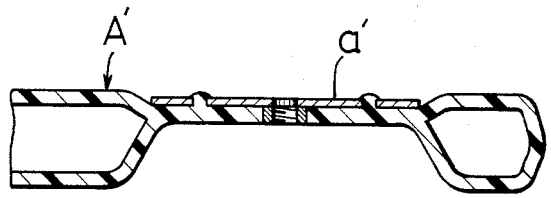
FIG. 1 is a longitudinal sectional view of one part of a conventional frame.
Figure 2:
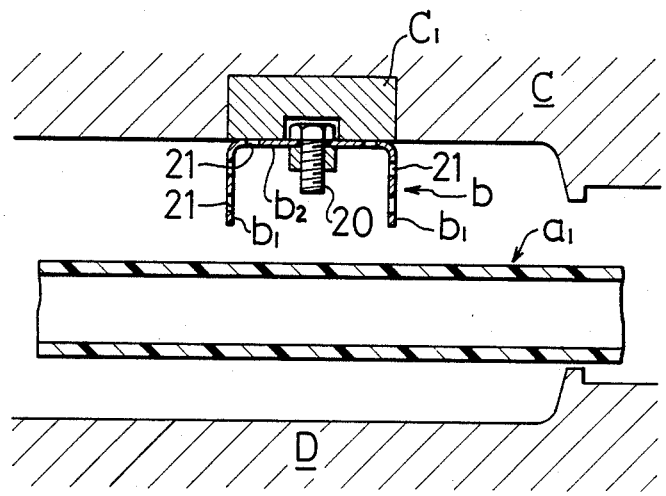
FIG. 2 is a longitudinal sectional view of a molding process according to the present invention.

FIG. 2 shows a molding state of a frame, wherein (C) and (D) show a blow molding die; and a stationary portion ($c_1$) made of a magnet is formed within said molding die at a prescribed position so as to mold the frame by engaging the top face of a metallic reinforcement plate (b). ($a_1$) is the parison.

Said reinforcement plate (b) is formed by folding a porous metallic plate in the shape of a band or a hard synthetic resin plate into the shape of ⊓ in section itself; and the heights of leg portion thereof ($b_1$) ($b_1$) are substantially equal to the thickness (the length between an upper plate (10) and a lower plate (11) of the frame) of said frame (A) and a latch member (20) such as a bolt etc is fitted at a prescribed position of a head portion ($b_2$) of said reinforcement plate (b). In the Figure, (21) (21) show the porosity for inflowing the synthetic resin thereinto for molding the frame (A).

Said reinforcement plate (b) is mounted at a reinforcement position in the frame (A) or a stationary position for stationing the frame (A) (for example, at a wall plate inside a vehicle).

Figure 3:
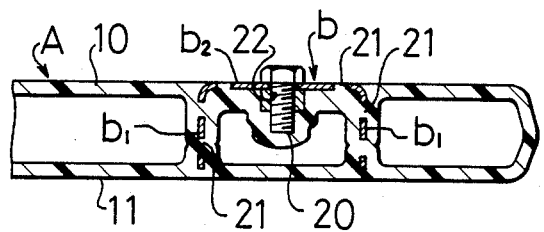
FIG. 3 is a longitudinal sectional view of one part of the frame molded according to the molding process of the present invention.
Figure 4:
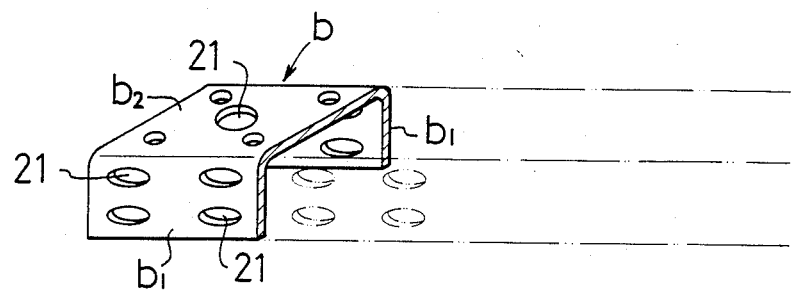
FIG. 4 is a perspective view of a reinforcement plate, being partially cut, to be employed according to the molding process of the present invention.

Thus, the frame (A) in the shape of a hollow plate as shown in FIG. 3 is flow molded by employing such synthetic resin as polyethylene, polypropylene etc; and the both leg portions ($b_1$) ($b_1$) of the reinforcement plate (b) are set up along the upper and lower plates (10) (11), thereby constituting a closed construction thereof. Synthetic resin for molding the frame inflows into the porosity (21) of the reinforcement plate (b) at the time of molding the frame (A) so that the leg portions ($b_1$) ($b_1$) may be adhered to the frame (A) because of said synthetic resin and become integral each other.

Figure 5:
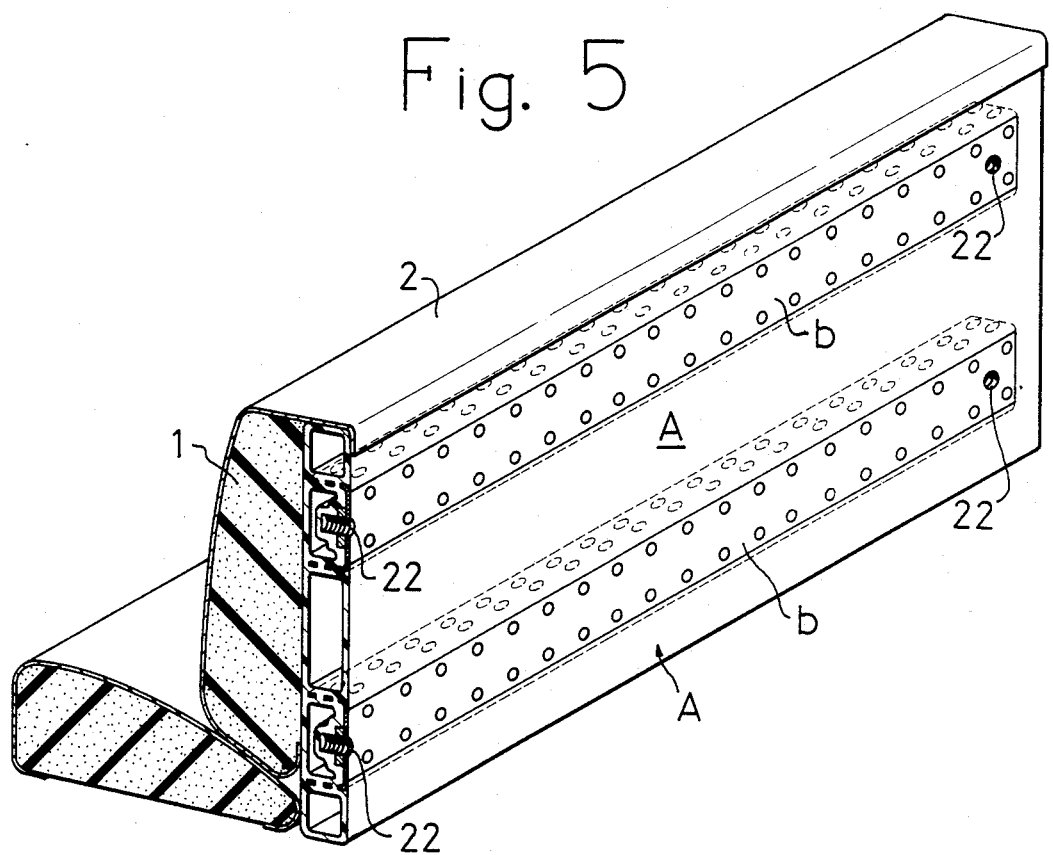
FIG. 5 is a use state of a frame molded according to the molding process of the present invention.

FIG. 5 shows the use state of the frame A according to the present invention. As shown in the Figure, a latch member such as a bolt is threadably inserted into a screw hole (22) so as to secure a seat back to a car body or a seat cushion frame etc at a suitable position thereof. In the Figure, (1) is a cushioning member made of a foam material and (2) is a top member material of a seat.

As set forth above, according to the present invention, it becomes considerably simple to mold a frame compared with a conventional process wherein a reinforcement plate is fixed to the frame after molding same. Moreover, the rigidity of the frame may be strengthened because the upper and lower plates of the frame are connected to each other to from a closed construction by means of the leg portions of the reinforcement plate. As a result, there is no fear of damage occurring at a coupling portion of the frame as often seen in the case of a conventional frame. Furthermore, the frame and the reinforcement plate are securely integrally formed because the reinforcement plate is formed of a porous plate; and as a result, there should be no fear that the reinforcement plate will be displaced from the frame.

What we claimed is:

1. A frame molding process of a seat for vehicles comprising the steps of:
   (a) providing a molding die adapted for blow-molding a synthetic resin into a hollow plate-shaped frame;
   (b) bending at least one porous metallic plate so as to form a reinforcement plate of a U-shaped configuration and section which has a pair of leg portions and each leg portion being of a length substantially equal to the thickness of said hollow plate-shaped frame;
   (c) removably mounting the top plane surface of said reinforcement plate onto the inner surface of said molding die such that said pair of legs of said reinforcement plate are positioned in a direction crossing the interior of said molding die; and (d) blowing a parison of said synthetic resin through said molding die in such a manner that upper and lower streaming walls of said parison are caused to run spaced apart from each other at a distance substantially corresponding to the length of said pair of legs of said reinforcement plate, whereby, in the course of blowing said parison, said upper and lower streaming walls of said parison are caused to cover the entire surfaces of said pair of leg portions and the inner surface of said reinforcement plate and to flow into the porosity of said reinforcement plate while at the same time said lower streaming wall of said parison is caused to run across the lower ends of said pair of leg portions, to thereby create a portion enclosed by said parison at the points corresponding to the position of said reinforcement plate.

* * * * *